May 19, 1964 A. ZAROUNI 3,133,994

CONFERENCE CIRCUIT FOR TELEPHONE SWITCHING SYSTEMS

Filed March 8, 1962 2 Sheets-Sheet 1

INVENTOR
A. ZAROUNI
BY William F. Simpson.
ATTORNEY

CONFERENCE CIRCUIT FOR TELEPHONE SWITCHING SYSTEMS

Filed March 8, 1962

2 Sheets-Sheet 2

INVENTOR
A. ZAROUNI
BY William F. Simpson
ATTORNEY 3,133,994

CONFERENCE CIRCUIT FOR TELEPHONE SWITCHING SYSTEMS

Alfred Zarouni, Brooklyn, N.Y., assignor to Bell Telephone Laboratories, Incorporated, New York, N.Y., a corporation of New York Filed Mar. 8, 1962, Ser. No. 178,329
10 Claims. (Cl. 179—18)

This invention relates to a conference circuit for a telephone switching system and more particularly to the inclusion of a conference circuit in a crossbar switching system.

Numerous conference circuits have been devised in the past for various types of private branch exchanges and for various types of switching systems, but these circuits are limited to the particular type of system for which they have been devised and are not suitable for use in a large crossbar switching system. Furthermore, transmission characteristics of these previous conference circuits have not been all that may be desired. More recently a conference circuit has been devised for crossbar switching systems wherein a conference may be automatically set up in response to a particular dialed code. Such conference circuits are applicable where it is desired to always include the same stations in the conference connection but are not flexible and do not permit conferences to be set up between any group of the stations as may be desired. Furthermore, such arrangements are large, complicated, and expensive.

It is, therefore, an object of this invention to provide a relatively simple conference circuit which does not require changing any of the circuits of a large crossbar system.

It is another object of this invention to provide an improved conference circuit in which any group of stations may be included in the conference connection as determined by the codes dialed for the respective stations to be included in the conference connection.

Another object of this invention is to provide an improved conference circuit in which any station connected thereto, or at least certain stations connected thereto, may cause other stations to be added to the conference circuit.

A feature of this invention relates to arrangements for permitting calls to certain stations from a conference connection to be abandoned.

Another feature of this invention relates to provisions for permitting additional stations to be added to a conference connection at any time up to the maximum number permitted by the particular conference circuit employed.

Another feature of this invention relates to the use of multifrequency calling signals in combination with a conference circuit in a crossbar switching system.

Another feature of this invention relates to switching means for automatically and repeatedly interconnecting an idle multifrequency receiver to a selected conference circuit.

The foregoing and other objects and features of this invention may be more readily understood from the following description when read with reference to the attached drawing in which.

Figure 1:
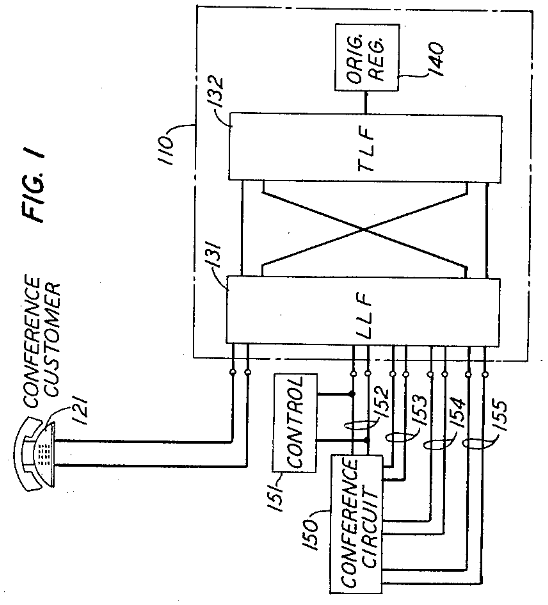
FIG. 1 shows in outline form the manner in which the conference circuit in accordance with this invention is interconnected with a crossbar switching system.

As shown in FIG. 1 a conference circuit in accordance with this invention is arranged to be interconnected with and cooperate with a crossbar switching system illustrated by a rectangle 110. This rectangle represents a crossbar switching system such as disclosed in Patent 2,585,904, granted February 2, 1952, to A. J. Busch.

Only three elements of such a crossbar system are shown in FIG. 1. These include the line link frame 131, the trunk link frame 132, and an originating register 140. The other elements of such systems, such as disclosed in the above-identified Busch patent, are also present and operate in their usual and normal manner to control the system. These elements include the marker, sender, and various interconnecting circuits and also charging and accounting circuits when desired. Subscriber's stations, of which station 121 is exemplary, are interconnected with the crossbar switching system 110. This subscriber's station is arranged to transmit multifrequency calling signals in place of the usual calling signals transmitted by dial. Such a typical subscriber's station is shown in United States Patent No. 2,232,398, granted to A. A. Lundstrum, February 18, 1941, and United States Patent No. 2,153,129, granted to H. M. Bascom, April 4, 1939.

Furthermore, the crossbar switching system 110 is provided with originating registers 140 which include multifrequency receivers for responding to the multifrequency calling signals transmitted by the subscriber's station 121. Such multifrequency receivers and registers are shown in United States Patent No. 2,237,742, granted April 8, 1941, to A. A. Lundstrum; United States Patent No. 2,403,475, granted to H. M. Bascom and F. A. Hubbard on July 9, 1946; and United States Patent 2,434,898, granted to H. M. Bascom and F. A. Hubbard on January 1, 1948.

As shown in FIG. 1 a conference circuit 150 in accordance with this invention is provided which has four permanently connected branches 152, 153, 154, and 155. The branch 152 is designated the input circuit for convenience in referring to it herein. The branches 153, 154, and 155 are called output branches for convenience in referring to them. Each of these branches comprises a transmission circuit for voice frequency signals and is arranged so that such signals originating on any one of the branches will be conveyed or transmitted to all of the other branches.

The various input and output branches of the conference circuit as shown in FIG. 1 are connected to the line link frame in lieu of ordinary subscribers' lines and cooperate with the switching system 110 in a manner similar to the manner in which the subscriber's lines cooperate therewith.

Typical conference circuits which may be employed in the combination of this invention are shown in A. Feiner, patent application Serial No. 820,552, filed June 15, 1959, now Patent 3,108,157 of October 22, 1963. Other conference circuits suitable for use in combination with this invention are shown in United States Patent 1,623,095, granted to G. Grisson et al. on April 5, 1927; Patent 2,019,603 granted to C. W. Greene on November 5, 1935; Patent 2,035,536, granted to F. A. Cowan et al. on March 31, 1936; and Patent 2,154,579 granted to J. A. Parrott on April 18, 1939.

As shown in FIG. 1 and in the above-identified patent application and patents, the conference circuit 150 is provided with four permanently connected branches. As shown in the other figures the control circuits for four branches are also provided. When it is desired to have a larger number of stations interconnected in the conference call a plurality of such conference circuits may be interconnected. With two such conference circuits, six stations may be interconnected and for each additional such conference circuit interconnected two more stations may be connected to the conference circuit. In addition, the various portions of the control circuit individual to the respective conference circuit branches must also be duplicated for the additional conference circuit branches.

Such a conference circuit may also include various amplifiers, echo suppressed voice controlled switching circuits, and the like to provide the desired quality of transmission from each of the branches to all of the other branches thereof.

A control circuit 151 is associated with an incoming branch of the conference circuit 150 and responds to calling signals transmitted from the subscriber's station 121 in the manner described herein. This control circuit is shown in greater detail in FIGS. 2 and 3. The various relays shown in the control circuit as well as the flip-flops are all in their released or normal state when no conference call is in progress through the associated conference circuit.

Figure 3:
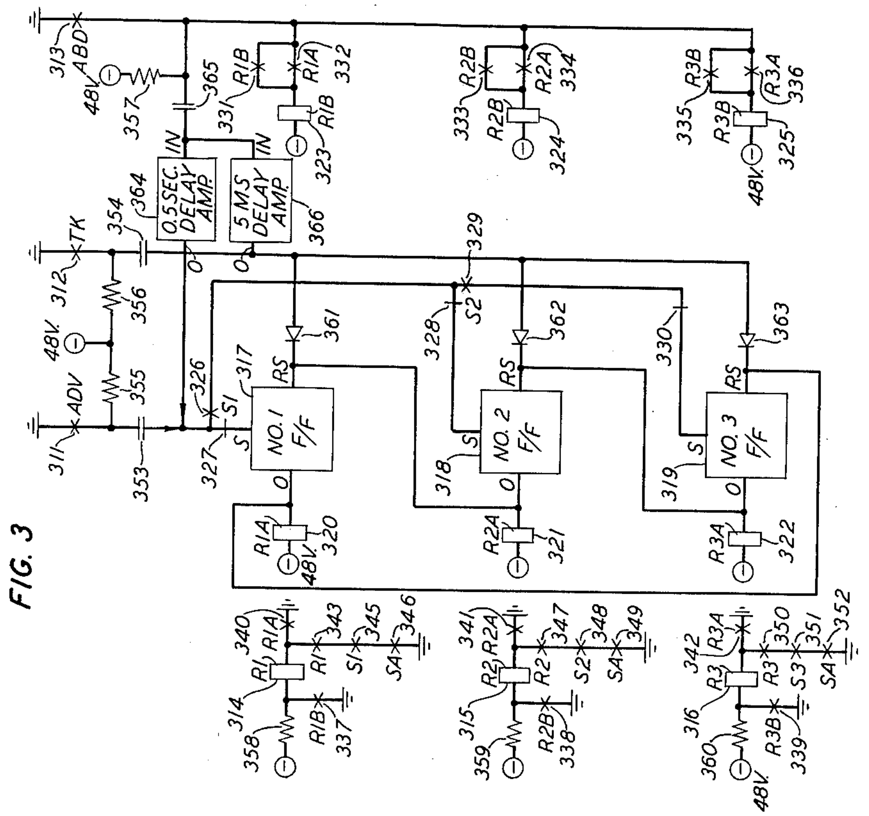
FIG. 3 shows other of the control circuits of the conference circuit.
Figure 2:
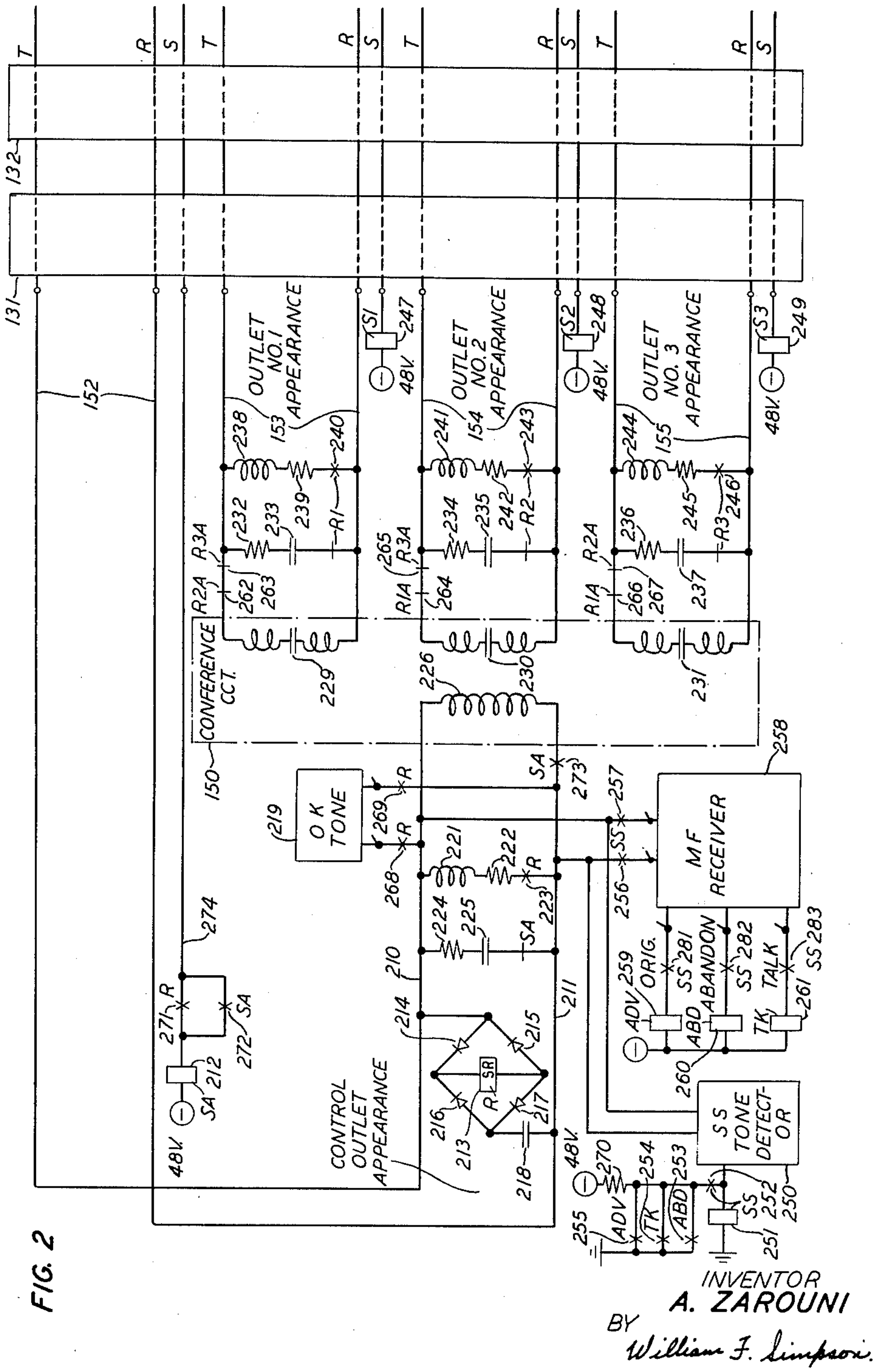
FIG. 2 shows in detail certain of the control circuits associated with the conference circuit.

Only one conference circuit 150 is shown in FIG. 1 and this circuit is represented in FIGS. 2 and 3 together with the control circuits and equipment. As many additional conference circuits may be provided as will be required to handle a desired maximum busy hour conference call required at the various switching centers 110. While only one such switching center is shown in FIG. 1, this switching center may be interconnected with other switching centers as described in the above-identified patent to Busch and as well known in the prior art. Thus, each of the calls from the conference circuit, as will be presently described, may be extended not only through the switching system 110 but through any one or more additional switching centers which may be similar to switching center 110 or of any other type of switching center.

When a subscriber such as the subscriber at station 121 desires to make a conference call, this subscriber will key pulse a preassigned code designating the conference circuits. This code may be a single-digit code, a two- or three-digit code or it may be a complete seven-digit code depending upon the code assigned to the conference circuit 150. The switching equipment 110 will respond to this call and code and set up an intraoffice call from the subscriber's station 121 to the input branch 152 of the conference circuit 150. In setting up this connection, the crossbar switching system 110 first establishes a connection from the subscriber's station 121 to the originating register 140 in the usual manner in response to the initiation of a call at the subscriber's station 121. Thereafter, the subscriber at station 121 will transmit multifrequency signals by means of keys frequently called key pulsing to the originating register 140. This multifrequency signal represents the code of the conference circuit 150 or more particularly the code of the input branch 152 of this conference circuit.

When the connection is established to this input branch tone will be returned to the subscriber whereupon the subscriber will transmit additional calling signals. These signals cause the control equipment to initiate a call on the No. 1 output branch 153 of the conference circuit. As a result, the switching equipment 110 will establish a connection from this output branch of the conference circuit to the originating register such as 140. This originating register, as discussed before, includes multifrequency reciving circuits to respond to multifrequency signals representing called station codes. This register will then return dial tone to the No. 1 outlet 153 of the conference circuit 150. This tone will be transmitted through the conference circuit to the input branch 152 and then through the switching equipment 110 again to the calling station 121.

Station 121 will then transmit multifrequency calling signals representing the code of the first station desired to be included in the conference call. These signals are within the voice frequency range and are thus transmitted from this station through the switching equipment 110, to the input branch of the conference circuit 150, through the conference circuit 150 to the output branch 153, and then through the switching equipment 110 again to the originating register 140. The originating register responds to these signals and causes the equipment 110 to set up a connection to the desired called station. This station may be connected to switching equipment 110 or to any other switching center which may be interconnected with the crossbar system 110 under control of dialed pulses or calling signals as is well understood in the prior art. When the called party answers, the subscriber at station 110 will inform him of his conference connection and that he should stand by or wait until other conference stations have been interconnected for the conference call.

The subscriber at station 110 will then again transmit a special calling code or signal and the control equipment 151 again responds thereto. As a result, a call will be placed on the No. 2 outlet 154 and a connection established from this outlet of an originating register similar to 140 in the manner described.

When desired, the transmission path from the output branch No. 1, 153 of the conference circuit 150 may be interrupted at this time so that the called subscriber does not hear all of the tones and signals transmitted over the system. However, a transmission path is maintained from the input branch 152 to the No. 2 output branch 154 so that thereafter the multifrequency signals originating at the subscriber station 121 representing the code of the second station to be included in the conference call will be conveyed from the station 121, through the switching equipment and the conference circuit 150, to the No. 2 outlet 154, and then through the switching equipment to the originating register 140. Thus a second connection, in response to these signals, will then be established to the second station desired to be included in the conference connection.

The transmission path from the output branch 153 need not be interrupted after a subscriber has been connected thereto. When this path is not interrupted the connected subscriber will hear the various signals transmitted by the conference circuit and the conversations with the other subscribers as they are connected to the conference circuit. In addition when this path is not interrupted the called subscriber, instead of the calling subscriber at station 121, may transmit the calling and control signals required to cause another subscriber to be added to the conference circuit, provided that his station is equipped to transmit the necessary multifrequency signals.

In a similar manner calls will be established from each of the output branches of the conference circuit through the switching equipment 110 or through this switching equipment and any additional equipment desired which may be interconnected therewith by means of calling signal codes. When connections have been established to all such stations to be included in the conference call, the subscriber at station 121 will transmit a special code or signal which the control equipment 151 responds to and reestablishes the transmission paths from the conference circuit to the connections established from the output branches of the conference circuit so that each subscriber to the conference call may communicate with all of the other subscribers.

If in placing a call from any of the output branches of the conference circuit to any desired or called subscriber's station it is discovered that this station is either busy or does not answer, the subscriber at station 121 may abandon a call to this particular station by transmitting a special tone or control signal to the control equipment 151 whereupon the call established last from an output branch of the conference circuit is abandoned; then this branch of the conference circuit may be employed to establish a call to another station to be included in the conference circuit in the manner described above.

If at any time during the conference call it is desired to add additional stations, provided that calls have not been established on all of the available branches of the conference circuit, additional calls may be transmitted from these idle output branches to the desired additional stations. If any station in the conference call wishes to be disconnected, they may terminate the call in the usual manner by placing the telephone instrument on its normal supporting means and after a time-out interval of approximately 30 seconds the switching equipment 110 will cause the connection from this output branch of the conference circuit to be disconnected. Thereafter the subscriber at station 121 may establish another call over this branch to the same or another station as may be desired. At the completion of the conference call the subscriber at station 121 will terminate the call whereupon all of the circuits in the switching center 110 as well as the circuits in other switching centers employed in the conference call will be restored to their normal condition. Similarly, the control equipment 151 and the conference circuit 150 will likewise be restored to their normal or idle condition.

When the subscriber at station 121 becomes connected to the input branch 152 of the conference circuit 150, the switching equipment 110 first tests this branch for continuity. This branch is shown in greater detail in FIG. 2 where resistor 224 and condenser 225 are interconnected between the tip and ring conductors 210 and 211 of this branch. This path provides for the satisfactory completion of the continuity test within the switching equipment 110. This equipment will then apply ringing current to the connection whereupon the R ringing relay 213 is operated in a path from the ring conductor 211 through condenser 218 and the rectifier bridge including the rectifier elements 214 and 215, 216 and 217 to the tip conductor 210. The R relay 213 is a slow-release relay and in operating closes contacts 271 which connects the winding of the SA relay 212 to the sleeve conductor associated with the input branch of the conference circuit. The SA relay is operated in this circuit because the switching equipment 110 applies ground to the sleeve conductor 274 to make this input branch busy when the input branch is seized. This operation of the switching equipment is described in the above-identified patent to Busch. The SA relay 212 in operating closes contacts 272 thus completing a locking circuit to the S conductor 274 independently of the R relay contacts 271.

Relay 213 closes contacts 223 which completes a direct-current path between the tip and ring through the inductor 221 and resistor 222. This direct-current path first causes interruption of the ringing current applied to these tip and ring conductors by the switching of equipment 110 and also provides a direct-current path between the tip and ring conductors for maintaining the supervision over this path so that the switching equipment 110 will not interrupt this path. The operation of the SA relay 212 closes contacts 273 which maintains a direct-current path between the tip and ring conductors 210 and 211 through the input circuit or coil 266 of the input branch 152 of the conference circuit 150.

The operation of the R relay 213 also causes contacts 268 and 269 to close and transmit an OK tone from source 219 back through the switching equipment 110 to the originating subscriber's station 121, thus indicating to the subscriber that a connection has been established to the conference circuit and that he should initiate calls to the stations desired to be included in the conference connection. The subscriber will then operate a special additional key and cause a special calling tone to be transmitted which is different from dial tone, different from the tone from source 219, and also different from the tones representing the various codes of the called stations.

The special service tone detector 250 responds to this special calling tone or tones and causes the SS relay 251 to be operated in response thereto. Relay 251 closes contacts 252 and thus completes a holding path through the resistor 270 to −48 volts. The operation of relay 251 interconnects a multifrequency receiver such as 258 to the tip and ring conductors 210 and 211 of the input branch 152 of the conference circuit 150 through contacts 256 and 257 and connects the output leads of the receiver 258 through contacts 281, 282, and 283 to the various operate relays discussed below.

Where desired, the multifrequency receiver may be individual to the conference circuit in which case the relay 251 need not necessarily cause the connection of the tip and ring conductors thereto. In this case, however, it may also connect it where it is desired to have this circuit disconnected during the normal transmission over the conference circuit during the conference call. Where desired, the operation of relay 251 may cause the selection of an idle one of a plurality of multifrequency receivers such as 258 if a plurality of these receivers are provided. Such selecting circuits are well known in the art and typical connecting circuits are disclosed in the above-identified patent to Busch. The subscriber will next operate one of the calling keys which has been predesignated as a prefix to the code of the desired calling station. The multifrequency receiver 258 will now respond to this code and cause the ADV relay 259 to operate.

The ADV relay operates only momentarily but sufficiently long to close contacts 255. These contacts apply ground to the left-hand winding terminal of relay 251 thus causing this relay to release and disconnect the multifrequency receiver 258. The advance relay 259 will likewise release. However, the release of relay 251 under these circumstances is slow because it is shunted down so that during this release time and the release time of relay 259, contacts 311 will be closed sufficiently long to actuate the flip-flop 317 from its normal state to its actuated state.

Contacts 311 in closing connect ground to the upper terminal of condenser 353 thus changing the voltage of this condenser from −48 volts to ground. This causes a positive pulse to be transmitted from this condenser and through the break contacts 327 of the S1 sleeve relay 257, which relay is not operated at this time, to the set terminal S of the No. 1 flip-flop 317. This pulse lasts only as long as required to change the charge on condenser 353 but is of sufficient duration to actuate the flip-flop 317 without further interfering with the operation of this flip-flop. Upon the subsequent release of the ADV relay 259, the upper terminal of condenser 353 will be again charged to −48 volts through the resistor 355. This causes a negative voltage to be transmitted from this condenser, but this voltage is of the wrong polarity and is of reduced magnitude due to the value of resistor 355 so that it does not further affect the operation of flip-flop 317 or any of the other flip-flops 318 or 319. Flip-flops 317, 318, and 319 may be of any suitable type such as shown in Part 6 of Military Standardization Handbook Selected Semiconductor Circuits, published by the Department of Defense of the United States.

When flip-flop 317 is actuated to its "1" state the potential applied to its "0" output will be raised from substantially −48 volts to substantially ground potential so that relay 320 will operate.

The operation of the R1A relay 320 causes contacts 340 to close and complete an obvious circuit for the operation of relay 314 from ground through the contacts 340, the winding of the R1 relay 314 to battery, through resistor 358.

Relay 314 in operating closes the contacts 240 of this R1 relay which connects a direct-current path across the tip and ring conductors of the first output branch of the conference circuits, thus simulating a call from this branch to the switching equipment 110 similar to a call being initiated by a subscriber. As a result, the switching equipment 110 responds and causes an originating register similar to register 140 to be interconnected with the tip and ring conductors of this branch whereupon dial tone will be transmitted from the originating register such as 140, through the trunk link from 132 and line link frame 131, to the first output branch 153 of the conference circuit 150. This tone appears across the tip and ring conductors in FIG. 2. The direct-current path between these conductors through the R1 relay contacts 240 includes an inductance 238 and resistor 239 which provides sufficient impedance to this tone so that it will be transmitted through the contacts 263 and 262 to the conference circuit 150. The details of the conference circuit may be in accordance with any of the above-identified patents or application. This tone is, therefore, transmitted from this output branch to the input branch 152 and then again through the switching equipment 110 to the subscriber's station 121.

The switching equipment 110 in addition to establishing a path from the No. 1 outlet branch 153 of the conference circuit to an originating register 140 also causes the S1 sleeve relay 247 to operate. This relay is connected to the sleeve and operates in parallel with the holding magnet when the connection is established, thus making this branch of the conference circuit test busy. In addition, the operation of the S1 sleeve relay 247 causes contacts 345 of this relay to close thus completing a locking circuit for the R1 relay 314 from ground through the operated contacts of the SA sleeve relay 346, operated contacts of the S1 sleeve relay 345, the operated contacts of the R1 relay 343, the winding of relay 314 to battery through resistor 358. This locking circuit maintains relay 314 operated until release either by operation of the R1B relay contacts 337 or the release of the contacts 345 or 346.

The subscriber may now key pulse or transmit calling signals in place of dial signals comprising multi-frequency tones representing the called station's number or designation. When all of these have been transmitted from the subscriber station over the audio frequency path to the originating register 140, through the switching equipment, through the conference circuit and then through the switching equipment a second time to the originating register where it will cause the connection to be set up from this first output branch 153 to the desired subscriber's station. This connection will be set up through the switching equipment 110 and the subscriber's station equipment to be connected thereto. It will be set up through other switching equipment should the subscriber station be connected to another switching center or central office which may be automatically reached by means of switching signals from the office 110.

This connection is set up in the usual manner of setting up connecitons in response to call signals stored in the register 140. In the process of setting up the connection, the called line is tested for busy and if found to be idle, ringing current will be applied to it. When the called subscriber answers, ringing current is interrupted and the subscriber may talk to the originating subscriber at station 121. The originating subscriber will then ask the called subscriber to stand by until he has called other stations to be included in the conference connection. The subscriber at station 121 will then again operate the special key causing a special service tone or group of tones to be transmitted from his station and through the switching equipment 110 to the incoming branch 152 of the conference circuit 150. As a result, the relay 251 will be operated. This tone is also transmitted to the first called station. As before, relay 251 is locked operated through contacts 252 to −48 volts through resistor 270. Relay 251 again connects or causes the multi-frequency receiver 258 to be connected to the incoming branch 152 of the conference circuit 150. The subscriber at station 121 will then again operate the special preliminary digit which again will cause the ADV relay 259 to operate and again cause relay 251 to release due to the operation of the contacts 255. In addition, during the time the ADV relay 259 is operated, contacts 311 will again close and again cause a positive pulse to be transmitted from condenser 353. At this time, however, the S1 sleeve relay 247 is operated with the result that contacts 327 and 326 are operated. Consequently, the positive pulse from condenser 353 is now transmitted through the operated contacts 326 and the break contacts 328 of the S2 relay 248, which is not operated, to the set input S of the No. 2 flip-flop 318 causing this flip-flop to be changed from its "0" or normal state to its "1" or actuated state. As a result, a positive voltage is applied from its zero output to the reset conductor RS of the first flip-flop 317, thus restoring this flip-flop to its original or 0 state and causing the R1A relay 320 to release. Relay 314 however, remains operated at this time due to a locking path from ground through the operated SA relay contacts 346, the operated S1 relay contacts 345, and the operated R1 relay contacts 343, the winding of the R1 relay 314 to battery through the resistor 358. The positive pulse from the "0" output of flip-flop 318 is prevented from affecting the operation of flip-flop 318 and 319 by the blocking or decoupling action of diode 361.

The operation of the flip-flop 318 to its actuated or "1" state causes the R2A relay 321 to operate and this relay in turn closes its contacts 341 thus completing a circuit for the operation of relay 315. This relay closes its contacts 243 and thus completes a direct-current path through the inductor 241 and resistor 242 between the tip and ring conductors of the second output branch 154 of the conference circuit 150. This appears to the switching system 110 as a request for service whereupon the switching equipment 110 will establish a path from this second output branch 154 to an originating register such as 140 and again cause dial tone to be transmitted through the switching equipment to the second output branch of the conference circuit 150 and then to the input branch and then through the switching equipment again to the subscriber's station 121. In addition, the switching equipment causes the S2 sleeve relay 248 to operate and close contacts 348, thus completing a locking circuit for relay 315 from ground, through the operated contacts 349 of the SA sleeve relay 212, contacts 348, the operated S2 sleeve relay 248, contacts 347 of the operated R2 relay, the winding of the R2 relay 315 to battery through resistor 359.

When it is desired to permit only the originating station to set up a conference call and when it is desired to prevent the other stations from receiving the calling tones and preliminary conversations to each station as it is added to the conference circuit, contacts 262, 263, 264, 265, 266, and 267 will be provided and connected as shown in FIG. 2. When these contacts are connected as shown in FIG. 2, the operation of the R2A relay 321 will cause the contacts 262 to open the path from the first output branch 152 of the conference circuit 150 to the first called subscriber so he will not receive the calling code of the second subscriber.

When it is desired to permit any subscriber who is already connected to the conference circuit to add another one or more subscribers to the conference circuit, the contacts 262, 263, 264, 265, 266, and 267 will not be provided or will be short circuited. When these contacts are short circuited, any subscriber who is already connected to the conference circuit and who has the multifrequency key pulsing equipment at his station may transmit the control signals in the same manner as the originating station and the equipment will respond in the same manner as described herein. Also when these contacts 262, 263, 264, 265, 266 and 267 are short circuited, each subscriber, after he is connected to the conference circuit, will receive the various tones employed to add other subscribers and thus indicate to him the progress of setting up the conference call or connections.

Upon the establishment of a connection through the switching equipment 110 to the originating register 140 from the No. 2 output branch 154 dial tone will again be transmitted from such originating register through the switching equipment 110 and to the No. 2 output branch of the conference circuit 150, and then to the input branch of this conference circuit, and again through the switching network 110 to the subscriber's station 121. The subscriber will then key pulse or signal the equipment of the code of the next or second station to be connected to the conference circuit. These signals are transmitted to the originating register 140 over the voice frequency communication path described above over which dial tone was transmitted.

On the completion of the key pulsing of the code for the second station, the switching equipment 110 will cause a connection to be set up from the No. 2 output branch 154 of the conference circuit 150. In the process of setting up this connection, the called station line will be tested for busy and if found idle, ringing current will be applied to the line.

Assume now for purposes of illustration that this second called station line is either busy or that the subscriber does not answer. Under these circumstances it is desirable to abandon this particular call without interrupting the connection to the first called station or without interrupting the connection to any of the previous called stations.

In order to abandon such a call or connection, the calling subscriber at station 121 will again operate his special service tone key. This causes the service tone or group of tones to be transmitted and detected by the tone detector 250 which causes relay 251 to be again operated. This relay then locks operated through its contacts 252 in the manner described before. The subscriber will then operate a different preselected one of his keys which key has been assigned the function of causing the last connection added to the conference circuit to be abandoned or disconnected. This tone or groups of tones will cause the ABD relay 260 to be operated. As a result, the contacts 253 are closed, which contacts shunt down the SS relay 251. This relay in turn disconnects the multifrequency receiver 258 and in turn allows the relay 260 to release.

However, during the time the ABD abandoned relay 260 is operated, contacts 313 will close and remain closed sufficiently long to transmit a positive pulse through the condenser 355 to the two delay networks 337 and 338. In addition, the operation of the contacts 313 will complete an operating circuit for the R2B relay 324 which circuit extends from ground through the closed ABD contacts 313, the closed contacts 334 of the R2A relay 321 and the winding of relay 324 to battery. The operation of the R2B relay 324 completes a locking circuit through its contact 333 to ground through the contacts 313 of the ABD relay 260. The operation of the R2B relay 324 closes its contacts 338 which completes a shunting circuit for the R2 relay 315 which relay releases and opens its contacts 243, thus abandoning the call previously placed on the No. 2 output branch 154 of the conference circuit 150. When this call is abandoned the S2 sleeve relay 248 will be released by the switching equipment 110 in the usual fashion due to the removal of ground from the sleeve conductor associated with this No. 2 output branch 154 of the conference circuit 150.

During the time required to release the R2 relay 315 and the time required to release the connection from the No. 2 output of the conference circuit, as described above, a positive pulse from the ABD relay will be transmitted through the delay device 366. In an exemplary embodiment of this invention the delay device 366 has a delay interval of approximately five milliseconds. This pulse is then transmitted to the RS lead of each of the flip-flops 317, 318, and 319 through the respective diodes 361, 362, and 363. Since flip-flops 317 and 319 are already in their normal condition, the pulse will produce no effect on these flip-flops. This pulse, however, will restore the No. 2 flip-flop 318 to its "0" state.

As above described, a pulse is also transmitted from the ABD contacts 313 and condenser 355 through the delay device 364. This delay device is provided with the delay interval of approximately a half second. The delay devices 364 and 366 may be of any suitable type including both electrical and acoustical delay lines, condenser timed circuits, slow-release relays or other suitable delay means.

At the end of approximately 0.5 second delay of the delay device 364, a positive pulse will be transmitted from this device and through the operated contacts 326 of the operated S1 relay 247 and the break contacts 338 of the now released S2 sleeve relay 248 to the set input lead S of the No. 2 flip-flop 318, causing this flip-flop to be operated to its "1" or actuated state. The output pulse from this flip-flop to the reset lead of the No. 1 flip-flop is ineffective at this time. However, the R2A relay 321 is again operated which, in turn, again causes the R2 relay 315 to be operated. As a result, the contacts 243 close again and cause another call to be initiated from the No. 2 output of the conference circuit. Thereafter, the subscriber will receive dial tone and then transmit the calling code in the manner described herein. If this subscriber had been the last one desired, then the calling subscriber will cause the TK relay 261 to be operated as described herein with the result that this second call will also be abandoned.

In the above described manner, the subcriber may transmit calling codes to as many stations as there are output branches of the conference circuit selected by his initial conference code. The calling subscriber need not have a station connected to every one of the output branches of the conference circuit. When he has called each of the desired stations and they are idle, the subscriber will then again operate the special service signal keys which again cause the special service tone to be transmitted, which tone is then detected by the detector 250 and this in turn again causes the SS relay 251 to be operated and lock in the manner described above. Operation of this relay causes a multifrequency receiver such as 258 to be again connected to the input branch 152 of the conference circuit 150. A subscriber will then operate another preassigned one of the code keys which will cause the TK or talk relay 261 to be operated by the MF receiver 258. As a result, the contacts 254 close and shunt down the relay and cause the MF receiver to be disconnected and relay 261 to release.

However, during the time the relay 261 is operated, contacts 312 close and cause a positive pulse to be transmitted from the condenser 354 to the reset input terminals of the flip-flops 317, 318 and 319, thus causing all these flip-flops to be restored to their idle condition and insure that the relays 320 and 321 and 322 are all released. If the contacts such as 262 through 267 are included in the output branches of the conference circuit, they will all be released and establish communication paths between all the stations of the conference circuit whereupon the conference call may proceed and wherein each station may communicate with all of the other stations on a two-way talking basis.

If during the conference it is found desirable to add an additional one or more stations or subscribers to the conference call, this may be accomplished in the same manner as described above when the various stations were added one at a time by the initiating subscriber. Thus the service code key is operated and then the "advance" code key followed by the code of the desired subscriber. The same procedure may be followed at any time during the conference call provided that there are still additional unused output branches of the conference circuit 150. If there are no such unused output branches, then the same results may be obtained if one or more of the stations connected to the conference circuit terminate his connection by replacing his telephone instrument on the switchhook cradle whereupon the switching equipment 110 will time out the connection for thirty seconds and then cause it to be torn down or released. At the end of this thirty-second interval, then one or the other station connected to the conference circuit may similarly cause another station to be added in the manner described above.

Inasmuch as all of the signaling is on a voice frequency basis for transmitting the various calling codes or special signals and providing contacts 262 through 267 which are not included in the output branches of the conference circuit, then after any station has been connected to the conference circuit that station may transmit the various special and preliminary codes followed by the calling code of a desired station to be added to the conference connection. Thus the tones will be transmitted through the switching equipment from the called station to the output circuit of the conference circuit connected therewith and then through the conference circuit to the input branch where they will actuate the circuits in the manner described above.

Such a conference network, as described herein, in addition to being employed to transmit voice frequency conferences may also be employed to transmit both telegraph and data signaling currents so long as these currents comprise alternating current having a frequency within the voice frequency range or in the bandpass frequency range of the various systems employed in setting up the connection and so long as these signaling currents do not contain frequencies which will be detected by the special service tone detector 250.

The foregoing description is a typical embodiment of this invention, the novel features of which are specifically described in the following claims appended hereto.

What is claimed is:

1. In combination in a crossbar telephone switching system, a subscriber's line, a conference circuit having permanently connected therewith an input branch and a plurality of output branches, means for establishing a connection from said subscriber's line to said input branch of said conference circuit, means connected to said input branch responsive to further signals transmitted from said subscriber's station for initiating a call on another branch, and means for transmitting subsequent call signals from said subscriber's station through said conference circuit to establish a connection through said crossbar switching system to said other branch of said conference circuit.

2. In combination a telephone switching system including a plurality of subscribers' line terminals, subscribers' lines connected to certain of said terminals, a conference circuit having a permanently connected input branch and a plurality of permanently connected output branches, means interconnecting each of said branches with other of said line terminals of said switching system, means responsive to calling signals from a subscriber's line for interconnecting said subscriber's line through said switching system with the input branch of said conference circuit, means responsive to a predetermined signal transmitted from said subscriber's station for initiating a call through said system from one of the output branches of said conference circuit, and means for controlling said call in response to additional signals transmitted from said subscriber's station and through said conference circuit.

3. In combination in a telephone switching system, a subscriber's station including a multifrequency signal transmitting device for transmitting calling signals, a conference circuit having a permanently connected input branch and a plurality of permanently connected output branches, said branches being permanently connected to line appearances on said switching system, means responsive to multifrequency calling signals transmitting by said device for interconnecting said subscriber's station with said input branch, and means responsive to an additional multifrequency signal transmitted from said device for initiating a call from one of said output branches through said switching system.

4. In combination in a crossbar telephone switching system, a subscriber's station including a multifrequency signal transmitting device, a conference circuit having a permanently connected input branch and a plurality of permanently connected output branches, means responsive to multifrequency calling signals transmitted by said device for interconnecting said subscriber's station with said input branch, means responsive to an additional multifrequency signal transmitted from said device for initiating a call from one of said output branches through said crossbar switching system, and means responsive to further multifrequency signals transmitted by said device from said subscriber's station and through said conference circuit for controlling the establishment of a connection from said output branch through said crossbar switching system.

5. In combination in a crossbar switching system, a conference circuit having a permanently connected input branch and a plurality of permanently connected output branches, a plurality of subscribers' stations each including a multifrequency signal transmitting device, means responsive to multifrequency signals transmitted from one of said stations for establishing a connection from said station through said crossbar switching system to the input of said conference circuit, means responsive to additional signals transmitted from said subscriber's station for controlling connections from output branches on said conference circuit to other of said subscribers' stations, and means responsive to multifrequency signals from one of said other stations for controlling other connections through said crossbar switching system between other output branches of said conference circuit and other subscribers' stations.

6. In combination in a telephone switching system, a plurality of subscribers' stations connected to said switching system, a multifrequency signal transmitting device included in each of at least certain of said subscribers' stations for transmitting calling signals, a conference circuit having an input branch and a plurality of output branches, said branches being permanently connected to said switching system, means responsive to multifrequency calling signals transmitted from said subscribers' stations for interconnecting the respective station through said switching system to said conference circuit, and means responsive to additional multifrequency calling signals transmitted from any subscriber's station interconnected with said conference circuit for controlling the interconnection of other subsecribers' stations with said conference circuit through said switching system.

7. In combination in a crossbar telephone switching system, a plurality of subscribers' stations connected to said crossbar system, a multifrequency signal transmitting device included in each of at least certain of said subscribers' stations for transmitting calling signals, a conference circuit having an input branch and a plurality of output branches, means responsive to multifrequency calling signals transmitted from said subscribers' stations for selectively interconnecting said conference circuit with said subscribers' stations, and means for preventing the transmission of multifrequency calling signals from said conference circuit to the subscribers' stations interconnected therewith.

8. In combination in a crossbar telephone switching system, a plurality of subscribers' stations connected to said crossbar system, a multifrequency signal transmitting device included in each of at least certain of said subscribers' stations for transmitting calling signals, a conference circuit having a permanently connected input branch and a plurality of permanently connected output branches, means responsive to multifrequency calling signals transmitted from said subscribers' stations for selectively interconnecting said conference circuit with said subscribers' stations, means for preventing the transmission of multifrequency calling signals from said conference circuit to the subscribers' stations interconnected therewith, and means responsive to a predetermined signal from the calling device at one of the subscribers' stations connected to said conference circuit for permitting communication between all the stations connected to said conference circuit.

9. In combination a crossbar telephone switching system, a plurality of subscribers' stations connected to said crossbar system, a multifrequency signal transmitting device included in each of at least certain of said subscribers' stations for transmitting calling signals, a conference circuit having a permanently connected input branch and a plurality of permanently connected output branches, means responsive to multifrequency calling signals transmitted by said device for interconnecting one of said subscribers' stations with said input branch, and means responsive to additional signals transmitted from said multifrequency calling device for initiating calls from each of said output branches in succession and through said crossbar system.

10. In combination a telephone switching system, a plurality of subscribers' stations connected to line appearances on said switching system, a multifrequency signal transmitting device included in at least certain of said subscribers' stations for transmitting calling signals, a conference circuit having an input branch and a plurality of output branches, means responsive to calling signals from one of said multifrequency devices for interconnecting one of said subscribers' stations with said input branch, means responsive to additional signals transmitted from one of said multifrequency calling devices for initiating calls from each of said output branches in succession and through said switching system, and means responsive to still other signals transmitted from one of said multifrequency devices for abandoning the last call initiated from one of said output branches, said branches being permanently connected to line appearances on said switching system.

No references cited.